(12) United States Patent
Blazey et al.

(10) Patent No.: US 6,231,931 B1
(45) Date of Patent: May 15, 2001

(54) METHOD OF COATING A SUBSTRATE WITH A STRUCTURAL POLYMER OVERLAY

(76) Inventors: John S. Blazey, 5546 Hilltop Oval, Parma, OH (US) 44134-2044; Gary Robertson, 201 Country Cove Cir., Clinton, MS (US) 39056; Joseph C. Sgro, 14963 Delaware Ave., Lakewood, OH (US) 44107

( * ) Notice: Subject to any disclaimer, the term of this patent is extended or adjusted under 35 U.S.C. 154(b) by 0 days.

(21) Appl. No.: 09/260,973

(22) Filed: Mar. 2, 1999

Related U.S. Application Data

(60) Provisional application No. 60/076,503, filed on Mar. 2, 1998.

(51) Int. Cl.[7] ........................................................ C08F 2/48
(52) U.S. Cl. ........................... 427/508; 427/512; 427/358; 427/393
(58) Field of Search .................................... 427/508, 512, 427/121, 358, 393

(56) References Cited

U.S. PATENT DOCUMENTS

| | | | |
|---|---|---|---|
| 4,072,770 | * | 2/1978 | Ting ........................................ 427/54 |
| 4,082,882 | * | 4/1978 | Weinstein et al. ................... 428/246 |
| 5,212,271 | * | 5/1993 | Beckett et al. ....................... 526/301 |
| 5,453,451 | * | 9/1995 | Sokol ..................................... 522/42 |
| 5,584,496 | * | 12/1996 | Rohrmoser ........................... 280/610 |
| 5,740,941 | * | 4/1998 | Lemelson ............................. 220/454 |

FOREIGN PATENT DOCUMENTS

| | | | |
|---|---|---|---|
| 3-197040 | * | 8/1991 | (JP) . |
| 10-168387 | * | 6/1998 | (JP) . |

* cited by examiner

*Primary Examiner*—Timothy Meeks
*Assistant Examiner*—Bret Chen
(74) *Attorney, Agent, or Firm*—Plunkett & Cooney PC; Arnold S. Weintraub

(57) ABSTRACT

A method of coating a wooden substrate or surface comprising the steps of depositing a layer of ultraviolet light curable polymer in an uncured form to at least one surface of a wooden substrate; and curing said polymer with an amount of UV energy sufficient to polymerize said polymer. The method optionally comprising the further steps of: scuffing the surface of the cured polymer; depositing a second layer of ultraviolet light curable polymer in an uncured form to the scuffed surface; and curing the second layer of ultraviolet light curable polymer with an amount of UV energy sufficient to polymerize said second layer. The method also contemplates a further step comprising scuffing the surface of the cured polymer; and depositing a top coat thereon.

9 Claims, No Drawings

METHOD OF COATING A SUBSTRATE WITH A STRUCTURAL POLYMER OVERLAY

This is a completion application of co-pending provisional application Ser. No. 60/076,503, entitled Method of Coating A Substrate With A Structural Polymer Overlay, filed Mar. 2, 1998.

BACKGROUND OF THE INVENTION

The present invention relates to a method of coating a wooden substrate. More particularly, the present invention relates to a method of coating a wooden substrate with an energy curable polymer. Even more particularly, the present invention relates to a method of coating a wooden substrate with a structural polymer having a substantially 100% solids content which is ultraviolet light curable.

Wood is used as a durable and inexpensive building material in numerous items including doors in houses and trucks, decks, ramps, buildings, roofs, etc. An even less expensive alternative to solid wood boards is plywood or fiberboard. Wood by its very nature is a porous material and tends to decay when exposed to the elements such as rain, snow, ice, wind, sun, etc. To preserve wood, numerous types of treatments and coatings have been developed. For example, wood can be treated with chemicals such as a copper solution or alternatively be painted. When wood is painted, the surface is typically primed with a solvent-based primer to prepare the porous surface for a finishing coat of paint. The primer is necessary due to the surface characteristics of the wood. The primer and paint work to seal the wood surface from exposure to the elements and additionally work to fill various fissures and crevices in the surface. Typical paints contain about 20% solids and 80% solvent. When paint is applied to a wooden surface, the solvent evaporates away to leave the solid behind. Solids typically are the paint pigment and a polymer material such as latex. Problems with paints result in adhesion and shrinkage. Because the typical paint contains only about 20% solids, the paint tends to shrink upon application and drying. A porous surface such as wood is especially difficult to seal. Thus, numerous coats of paint along with the associated prolonged drying times are required to effectively seal and fill the porous surface. The multiple step processes associated with multiple coats of paints are undesirable, especially in a manufacturing setting, and are therefore to be avoided were possible.

Plywood or fiberboard offers additional problems over solid wood products. Plywood is typically made of pressed wood particles held together with glue or adhesives. Solvents used in the production of plywood often linger in the pressed wood long after the plywood is manufactured. These solvents tend to leach from the plywood and can create bubbling and blistering in a painted surface. For example, plywood or fiberboard is often used in the manufacture of truck doors that roll up when opened. The doors are formed with a plurality of wood slats individually hinged together and roll upwards upon a track connected to a door frame. It was discovered early on that fiberboard used to make these slats could not be economically painted due to the porosity of the surface and incompatibility of paint with glues and solvents present in the plywood. The roll-up truck door industry responded to the problem by covering the plywood slats with a veneer or cardstock paper covering. The covered slates or medium density overlay (MDO) could then be more effectively painted. It has been discovered that the present day technique of covering the plywood or fiberboard slats with a paper covering glued to the surface and then painting the surface does not adequately seal the door from exposure to the elements. It has also been discovered that the use of a veneer or paper covering of the slates adds a needless step in the production process of manufacturing overhead roll-up truck doors.

The present invention overcomes the above mentioned problems and others. As noted hereinabove, the present invention provides a method of coating a substrate with an ultraviolet (UV) light curable polymer or polymeric coating. The present method is particularly adapted for coating a "wooden" substrate and, in particular, the panels or slats comprising a vehicular wooden roll-up overhead door. The present invention enables the coating of such a wooden substrate with a structural polymer overlay having a substantially 100% solids content, in an ultraviolet light curable formulation, to create a waterproof, weatherproof, pore-bridging, grainfilling, surface strengthening member. The coating may be used as a single coat or as a layer suitable for receiving topcoats without primers. As noted, the present invention is particularly adapted for manufacturing vehicular overhead roll-up wooden doors.

DETAILED DESCRIPTION OF THE PREFERRED EMBODIMENT

In a first aspect of the present invention, there is provided a method for applying the coating to a wooden substrate which, generally, comprises the steps of:

(a) applying a first layer of a structural polymer, in an uncured form, to at least one surface of the substrate, the polymer being an ultraviolet light curable filler polymer; and (b) curing the polymer of the first layer.

Additionally, after curing the polymer of the first layer, the layer may be scuffed to allow application of subsequent layers of the polymer to the resulting surface of the substrate, which additionally may be cured, and scuffed in repeated fashion to provide as many layers as desired.

The method of the present invention eliminates the need for paper overlays normally applied on exterior paint grade plywood and similar substrates. In addition to eliminating the need for paper overlays, such polymer coating provides protection to the underlying substrate from moisture and extreme weather conditions, and, thus, seals the substrate. The provided protection more adequately prevents undesired warping and degradation of the substrates.

According to the method hereof, the first layer of the polymer, in an uncured form, is applied, at ambient temperature and pressure, to at least one surface of the substrate to a depth of about 0.2 to 60 mils and, preferably, to a depth of about 1.0 to 2.0 mils. The polymer is applied to the at least one surface of the substrate by any suitable method known to those skilled in the art to which the present invention pertains. Ordinarily, the methods used include, but are not limited to, spraying, immersion or dipping, roll coating (reverse fill, direct roll, etc.), and curtain coating.

The reverse fill roll coating method is the method that is preferably used. The reverse fill roll coating method is a method where the uncured polymer is applied across the surface of the substrate by direct rolling, either by hand or mechanically, and is followed by a reverse direction rolling, leaving the surface adequately filled with polymer.

Once the first layer has been applied onto a surface of the substrate, the first layer of the polymer is cured by exposure to an energy source, preferably UV light. As further detailed hereinbelow, the step of curing is a chemical reaction, which causes the liquid resins to solidify by way of a free radical or cationic polymerization reaction. The mode by which curing the polymer is achieved is dependent on the particular polymer used.

As stated hereinabove, after the application of polymer is complete, the polymer is cured. The polymer is cured by exposure to an energy source, preferably a dose of UV radiation, in a dosage which, generally, ranges from between about 0.005 joules/cm$^2$ to about 15 joules/cm$^2$. Preferably, the radiation dose ranges from between about 1 joules/cm$^2$ to about 9 joules/cm$^2$ or about 300 to 400 wpi at about 20 to 80 fps. Typically, curing is done with a UV lamp within the focal point of one or more focused lamps, in order to reduce the likelihood of elevated heat levels. Elevated heat levels may cause the cured polymer to shrink. Elevated heat levels may also cause the cured polymer to crack. The curing of the UV curable polymer is effected by a rapid polymerization reaction which is initiated by a photoinitiator component of the composition, as detailed below, when it is exposed to UV light. Substantially the entire composition remains in place on the substrate during and after curing.

The first layer is a complete coating in and of itself. In another embodiment of the invention, after full cure of the first layer of the polymer, the resulting surface of the substrate is scuffed, either manually or mechanically, with an abrasive material, or is sanded using, preferably, a wide belt sander, to remove the uppermost peaks of the cured polymer surface. The step of scuffing or sanding promotes adhesion of an additional polymer coating to the substrate or enables the application of a final topcoat, where either of such subsequent coat desired.

After the first layer is applied, cured, and scuffed, a second layer of the polymer, in an uncured form, may be applied to the resulting surface of the substrate. The second layer of the polymer may then also be cured and scuffed, as detailed hereinabove. Subsequent layers of the polymer in an uncured form may be applied to the resulting surface of the substrate, cured, and then scuffed, as necessary, to achieve the desired thickness and effect. The resulting surface may be sanded or scuffed as detailed hereinbelow to aid in the adhesion of a top coat.

Optionally, a topcoat may be applied to the resulting surface of the substrate after the first layer of the polymer, or after the second layer of the polymer, or after the subsequent layers of the polymer are applied. Where used, the topcoat is applied at a depth of about 0.1 to 10 mils and, preferably from about 2.0 to 4.0 mils, and cured to retain sheen. The topcoat is, preferably, a UV curable coating which is cured under a dose of UV radiation which, preferably, ranges between 1 joules/cm$^2$ to 9 joules/cm$^2$. The topcoat may be rubbed out, if necessary, to provide the desired effect. The topcoat provides durability to the surface of the substrate and aids in light refraction to make the surface of the substrate aesthetically pleasing.

The polymer used herein, generally, comprises a polymerizable liquid UV light curable polymer. The UV curable polymer may include at least one acrylate-containing compound and a photoinitiator. UV curable polymers have an advantage of curing very quickly upon exposure to a UV source. UV curable polymers are also non-yellowing upon cure.

It is to be appreciated that the first layer of the polymer and subsequent layers thereof according to the method of the present invention may be the same or different polymers.

Preferably, the polymer used in the method of the present invention is an acrylate-containing UV light curable polymer. The acrylate polymer may be selected from the group consisting of monoacrylates, diacrylates, triacrylates, urethane-modified acrylates, polyester-modified acrylates and mixtures thereof. The polymer, preferably, includes a mixture of acrylates. Suitable compounds which may be used in the practice of the present invention include, but are not limited to, trimethylolpropane triacrylate, 1,6 hexane diol diacrylate, aliphatic urethane acrylates, vinyl acrylates, epoxy acrylates, ethoxylated bisphenol A diacrylates, trifunctional acrylic ester unsaturated cyclic diones, polyester diacrylates, and mixtures of the above compositions and other suitable compounds.

The preferred UV curable polymer is, generally, admixed with a photoinitiator. Such admixture, usually, comprises from about 80 to about 99.9 percent, by weight, based on the total composition weight, of the polymer; and from about 0.1 to about 15 percent, by weight, based on the total composition weight, of the photoinitiator.

More preferably, the composition hereof includes from about 90 to 99.5 percent of the polymerizable compound and from about 0.5 to about 8 percent of the photoinitiator.

Where the application of the polymer onto the substrate involves spraying, generally, a mixture of at least one high molecular weight polymer and at least one low molecular weight polymer is used. As is known to those skilled in the art, the Joule-Thompson phase separation takes effect when an improper mixture of high molecular weight and low molecular weight is used with the spraying method application. Generally, when an improper mixture thereof is used, the low molecular weight particles vaporize due to the resulting increased volume, and the high molecular weight particles congeal. Thus, at ambient temperature and pressure, a preferred mixture of 40% high molecular weight polymers and 60% low molecular weight polymers allows for an effective spraying application to form the polymer layers.

The photoinitiator initiates a polymerization reaction in the composition when it is exposed to ultraviolet light. The photoinitiator which is used in the composition of the present invention may be of the free radical or cationic type. A combination of photoinitiators may be used. Photoinitiators which are suitable for use in the practice of the present invention include, but are not limited to, 1-phenyl-2-hydroxy-2-methyl-1-propanone, oligo {2 hydroxy-2 methyl-1-[4-(methylvinyl)phenyl]propanone}, 2 hydroxy 2-methyl 1-phenyl propan-1-one, 1-hydroxycyclohexyl phenyl ketone and benzophenone.

The polymer of the present invention may be cured by natural sunlight, artificial UV lights, or long wave ultraviolet light depending on the photoinitiator package used. The curation by artificial UV lights may include medium pressure mercury arc lamps, doped lamps, electrodeless lamps, and the like.

Such a 100% solids content UV-curable polymer is more particularly described in U.S. Pat. No. 5,453,451, the disclosure of which is hereby incorporated by reference.

To provide a superior surface, after each application of the polymer in uncured form to the resulting surface of the substrate, the polymer may be either screeded, reverse-fill roll coated, or raked into the valleys in the resulting surface of the substrate with, preferably, a flat straight edge or allowed to self-level into the valleys of the cured polymer surface.

As applied, the first layer of the polymer settles upon the surface of the substrate, the first layer occupying the pores thereof. The first layer, thus, provides a filler medium which creates a seal to prevent outside moisture from changing the integrity of the substrate. The second and subsequent layers provide for the thickness of the overlay as desired by the end user.

Any subsequent layers of the polymer are applied, when necessary, in an uncured form to the surface of the substrate at a depth of about 0.2 to 60 mils and, preferably, from about 1.0 to 2.0 mils, and cured until the valleys of the surface are filled, the surface of the substrate is smooth, and the desired thickness and effect is achieved. As further detailed hereinbelow, once each application of the polymer is cured, the peaks of the surface may be flattened, such as by scuffing or sanding, until the surface of the substrate is level. The inside of any low spots may be manually finished to aid the adhesion of the next application of the polymer.

Although described hereinabove as preferably a wooden substrate, the substrate upon which the present invention is applied may be any material which allows proper adhesion and curing of the polymer in accordance with the method of the present invention. The substrate may be, but is not limited to, an exterior grade veneer plywood such as Poplar face/Fircore plywood with exterior glue.

As noted hereinabove, a topcoat may be applied as the final step. Preferably, the topcoat is a UV curable coating composition and most preferably is an acrylate system of one or more acrylates. Such acrylates include, but are not limited to, aliphatic urethane acrylate, epoxy acrylate, monofunctional acrylate monomer, and aliphatic trifunctional acrylate.

The resulting surface or coating protects the substrate from moisture and heat, and lessens the potential of degradation and warping thereof. The resulting surface may be used as an outside surface or paneling of equipment or apparatus that are exposed to outdoor weather such as a truck-trailer, a traincar, etc.

As is known to those skilled in the art to which the present invention pertains, a truck-trailer typically includes a roll-up overhead door with paper overlays to the wooden panels. Such a door, usually, comprises a plurality of interconnected panels each having a wooden substrate which may comprise a pressed wood, a single wooden slab, or the like over which paper overlays are applied to each panel. Heretofore, such paper overlays deposited in the wooden panels were used for sealing the underlying wood from moisture or heat, thus lessening the potential for wood degradation thereof.

The resulting surface hereof eliminates the need for paper overlays. The resulting surface is particularly adapted for the manufacture of vehicular wooden roll-up overhead doors, e.g., doors of truck trailers. Thus, the present invention more effectively protects the substrate from extreme weather conditions by occupying the pores of the substrates and, thus, acts as a sealant therefor.

In another aspect hereof, there is provided a method of coating a substrate with a fiberglass overlay saturated with a substantially 100% solids content UV light curable polymer or UV curable polymeric coatings. Reinforcing fibers of other compounds may be mixed into the structural polymer formulation as a pre-reinforced formulation.

The method, in accordance to this aspect of the present invention, generally, comprises the steps of:

(a) depositing a fiberglass layer of material onto a substrate;

(b) applying a first layer of the structural polymer in an uncured form to at least one surface of a substrate; and (c) curing the polymer with an ultraviolet light source.

The method may further comprise the steps of:

(d) scuffing the surface of the cured polymer; and (e) optimally, applying a second layer of the structural polymer in an uncured form to the fiberglass layer and the at least one surface of a substrate.

Subsequent layers of the polymer may thereafter be applied to the resulting surface of the substrate, cured, and scuffed, and, in as many layers as desired.

The method of this aspect of the present invention provides for a fiberglass layer substantially saturated by the structural polymer being deposited on the substrate. When solidified, the resulting combination of the fiberglass layer and the structural polymer further adds strength to the surface of a substrate. This method provides added expansion and contraction resistance to the surface of the substrate, which provides the substrate with substantial resistance to temperature and moisture extremes. Additionally, the method provides for a resulting surface which is a highly impact resistant surface. In wetting, the fiberglass is placed in a pool of liquid polymer. The polymer is then rolled or otherwise pressed into the fiberglass, either manually or mechanically, to substantially saturate the fiberglass. This wetted material is then placed onto the substrate as described above.

A multitude of woven glass strands that comprise the fiberglass layer have very high tensile strength when substantially saturated in the cured structural polymer. That is, the cured structural polymer holds the woven glass strands, resulting in added strength to the substrate. The fiberglass may be of any suitable form, such as, cloth, mesh, or "fiberglass chop." The thickness thereof, preferably, ranges from 0.5 mils to 60 mils.

In applying the first layer of uncured polymer and depositing the fiberglass, the fiberglass layer, itself, may be pre-wetted and soaked with the uncured polymer and, deposited onto a dry substrate. Alternatively, it may be placed into a "wet" layer of uncured structural polymer, already deposited onto the substrate.

After placing the wetted fiberglass layer onto dry substrate or laying a dry mat into the "wet" layer of the structural polymer, the structural polymer is pressed, such as by rolling, into the fiberglass, preferably by a direct pressure roller. The rolling step de-airs, or provides air-release to, the fiberglass layer which substantially frees the fiberglass layer of any entrapped air therewithin. Additionally, the rolling step enables the fiberglass layer to be substantially saturated with the structural polymer.

As in the first aspect of the present invention, the layer of a structural polymer in an uncured form is applied to at least one surface of a substrate, at ambient temperature and pressure, to a depth of about 0.2 to 60 mils and, preferably, to a depth from about 3 to 8 mils.

The substantially saturated fiberglass layer is deposited on the at least one surface of the substrate, preferably, by either curtain coating (hand) or roll coating (mechanically), both techniques being well known in the art.

Once the fiberglass layer is deposited on the substrate, a second layer of uncured structural polymer may be applied thereover to a thickness as desired. The substrate and the fiberglass layer disposed thereon is cured as described in the hereinabove mentioned first embodiment. Additionally, as also mentioned hereinabove, after curing, either scuffing or buffing may be performed thereon to achieve the desired fineness. Moreover, as described above, a final topcoat may be applied thereover.

In practicing the present invention, additives may be added to the curable filler polymer and the curable topcoat. Such additives include, but are not limited to, pigments, flow additives, sanding agents, inert fillers, reinforcement fibers, and other suitable matter.

Following is an illustrative example where all parts are by weight absent contrary indications.

EXAMPLE I

At ambient temperature and pressure, a first layer of a UV curable filler polymer is applied to a surface of an exterior grade veneer plywood to a thickness of 1.5 mils, by reverse fill roll-coating. The surface with the uncured filler polymer is then cured by exposure to a UV light source at 2 joules/cm$^2$. The first layer of cured UV curable filler polymer is scuffed or sanded with 180 grit sandpaper. Next, a second layer deposited to a depth of 1.5 mils, of uncured UV curable filler polymer is applied to the scuffed surface. The layer of polymer is cured by exposure to an UV light source at 2 joules/cm$^2$. The second layer of cured UV curable filler polymer is scuffed with 180 grit sandpaper. Then 2 mils of topcoat is applied and UV cured at 2 joules/cm$^2$.

To determine the degree of adhesion of the layer on the plywood surface, a cross-hatch and tape pull-off method is performed on the resulting surface in accordance with ASTM procedures.

Herein the UV curable filler polymer is:

|  | Parts by percent weight |
| --- | --- |
| aliphatic urethane acrylate | 30 |
| epoxy acrylate | 0 |
| monofunctional acrylate monomer | 30 |
| difunctional acrylate monomer | 15 |
| aliphatic trifunctional acrylate | 10 |
| photoinitiator | 4 |
| additives | 11 |
| TOTAL | 100% |

Herein, the UV curable topcoat is:

|  | Parts by percent weight |
| --- | --- |
| aliphatic urethane acrylate | 20 |
| epoxy acrylate | 10 |
| monofunctional acrylate monomer | 20 |
| difunctional acrylate monomer | 20 |
| aliphatic trifunctional acrylate | 21 |
| photoinitiator | 4 |
| additives | 5 |
| TOTAL | 100% |

This polymer has exhibited excellent adhesion to the plywood surface.

While the invention has been illustrated in detail in the drawing and in the foregoing description, the same is to be considered as illustrative and not restrictive in nature. It is understood that only the preferred embodiment has been shown and described fully and that all changes and modifications that come within the spirit of invention are desired to be protected.

Having thus described the invention, what is claimed is:

1. A method of coating and sealing a porous pressed particle wooden slat, comprising:
   (a) providing a porous pressed particle wooden slat;
   (b) depositing onto the slat a substantially 100% solids ultraviolet light curable coating composition consisting essentially of:
      (1) a mixture of acrylates, the acrylates being selected from the group consisting of monoacrylates, diacrylates, triacrylates, urethane-modified acrylates, polyester-modified acrylates, and mixtures thereof; and
      (2) a photoinitiator;
   (c) exposing the coating composition to ultraviolet light to cure the composition,
   (d) scuffing the surface of the cured polymer; and
   (e) depositing a topcoat on the surface, and
   wherein the composition eliminates the need for a paper overlay to protect the slat from weathering, the composition filling the pores of the pressed particle wooden slat.

2. The method of claim 1 wherein the photoinitiator is present in an amount from about 0.1% to about 15% by weight based on total composition.

3. The method of claim 1 wherein the substantially 100% solids ultraviolet light curable coating composition is deposited by roll coating.

4. The method of claim 3 wherein the step of depositing the topcoat is deposited by roll coating.

5. A method of coating and sealing a porous pressed particle wooden slat, comprising:
   (a) providing a porous pressed particle wooden slat;
   (b) depositing onto the slat a substantially 100% solids ultraviolet light curable coating composition consisting essentially of:
      (1) a mixture of acrylates, the acrylates being selected from the group consisting of monoacrylates, diacrylates, triacrylates, urethane-modified acrylates, polyester-modified acrylates, and mixtures thereof; and
      (2) a photoinitiator;
   (c) exposing the coating composition to ultraviolet light to cure the composition,
   (d) scuffing the surface of the cured polymer
   (e) depositing onto the surface of the scuffed polymer a second layer of said substantially 100% solids ultraviolet light curable coating composition;
   (f) exposing the second layer of coating composition to ultraviolet light to cure the composition;
   (g) scuffing the surface of the cured polymer; and
   (f) depositing a topcoat on the surface;
   wherein the composition eliminates the need for a paper overlay to protect the slat from weathering, the composition filling the pores of the pressed particle wooden slat.

6. The method of claim 5 wherein the photoinitiator is present in an amount from about 0.1% to about 15% by weight based on total composition.

7. The method of claim 5 wherein the substantially 100% solids ultraviolet light curable coating composition is deposited by roll coating.

8. The method of claim 5 wherein the topcoat is deposited by roll coating.

9. A method of coating and strengthening a porous pressed particle wooden substrate, the method comprising the steps of:
   (a) depositing a layer of fiberglass onto a porous pressed particle wooden substrate;
   (b) depositing a layer of ultraviolet light curable polymer in an uncured form onto the layer of fiberglass material to saturate the fiberglass with the polymer; and
   (c) curing said polymer with an amount of UV energy sufficient to polymerize said polymer.

* * * * *